(12) United States Patent
Wee

(10) Patent No.: US 7,562,563 B2
(45) Date of Patent: Jul. 21, 2009

(54) APPARATUS FOR AUTOMATICALLY INSPECTING ROAD SURFACE PAVEMENT CONDITION

(76) Inventor: Seong-Dong Wee, 102-704. Shinsung Misozium APT. 822, Majang-dong, Seongdong-gu, Seoul (KR) 133-735

( * ) Notice: Subject to any disclaimer, the term of this patent is extended or adjusted under 35 U.S.C. 154(b) by 0 days.

(21) Appl. No.: 12/015,598

(22) Filed: Jan. 17, 2008

(65) Prior Publication Data

US 2008/0184785 A1    Aug. 7, 2008

(30) Foreign Application Priority Data

Feb. 1, 2007    (KR) .................... 10-2007-0010603

(51) Int. Cl.
*G01B 11/30* (2006.01)
(52) U.S. Cl. .................... 73/104; 73/105
(58) Field of Classification Search ............ 73/104, 73/105, 146; 356/601, 608; 702/40
See application file for complete search history.

(56) References Cited

U.S. PATENT DOCUMENTS

| | | | |
|---|---|---|---|
| 4,052,712 A * | 10/1977 | Ohama et al. ............ 352/121 |
| 4,653,316 A * | 3/1987 | Fukuhara .................... 73/146 |
| 4,674,327 A * | 6/1987 | Swindall et al. ............ 73/146 |
| 4,700,223 A * | 10/1987 | Shoutaro et al. ........... 348/148 |
| 4,741,207 A * | 5/1988 | Spangler .................... 73/146 |
| 5,075,772 A * | 12/1991 | Gebel ....................... 348/135 |
| 6,615,648 B1 * | 9/2003 | Ferguson et al. ........... 73/146 |

FOREIGN PATENT DOCUMENTS

DE        4213222 A  * 10/1993  .................. 73/146

* cited by examiner

*Primary Examiner*—Daniel S Larkin
(74) *Attorney, Agent, or Firm*—Ladas & Parry LLP

(57) ABSTRACT

Provided is an apparatus for automatically inspecting a road surface pavement condition, includes: a road surface photographing unit; a road surface rutting measuring unit; a flatness measuring unit; a data analysis and storage unit; a traveling noise measuring unit; and an auxiliary unit for supplying electric power. The automatic road surface pavement condition inspection apparatus is equipped in a vehicle and thus automatically inspects a road surface pavement condition and a state of surrounding circumstances of a road, when the vehicle runs along the road, to thereby make up and offer objective data that everyone can easily grasp and thus provide a road inspector with the objective data for maintenance and repair and post-control and pre-control of the road.

1 Claim, 2 Drawing Sheets

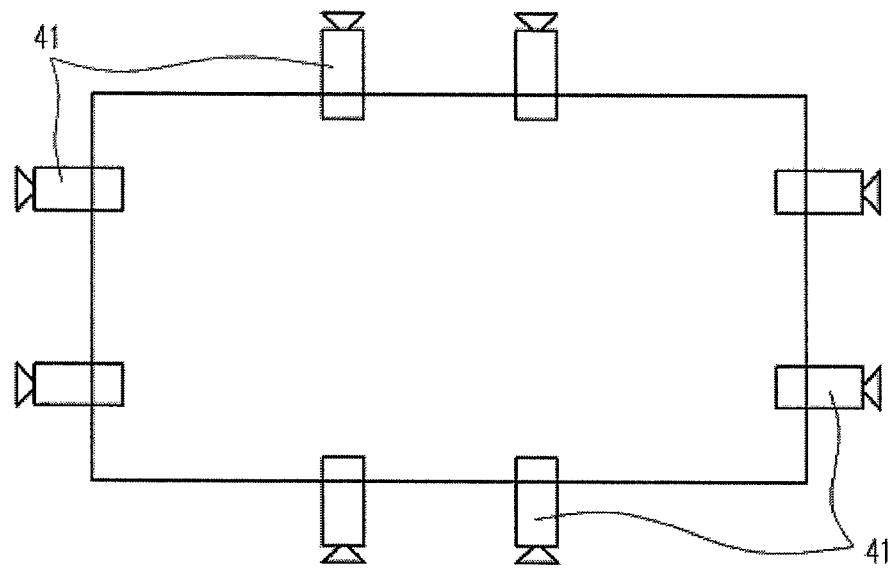
[FIG. 2]
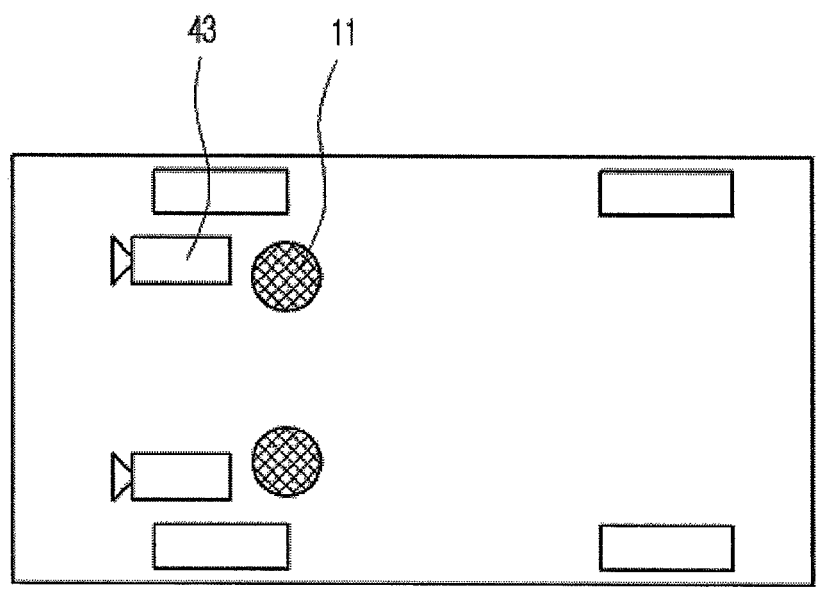
[FIG. 3]

APPARATUS FOR AUTOMATICALLY INSPECTING ROAD SURFACE PAVEMENT CONDITION

CROSS-REFERENCE TO RELATED APPLICATION

This application claims the benefit of Korean Patent Application No. 10-2007-0010603, filed on Feb. 1, 2007, and then registered as Korean Patent Registration No. 10-0758705 on Sep. 7, 2007, in the Korean Intellectual Property Office, the disclosure of which is incorporated herein by reference.

BACKGROUND OF THE INVENTION

1. Field of the Invention

The present invention relates to an apparatus for automatically inspecting a road surface pavement condition of a road or an airport runway, and more particularly, to an automatic road surface pavement condition inspecting apparatus which automatically and comprehensively inspects a road surface pavement condition, to thereby make up and offer objective data.

2. Description of the Related Art

A number of vehicles run on roads. Heavy loads or impacts are always imposed on surfaces of roads, due to travelling resistances of vehicles and weights of the vehicles. Accordingly, a lot of deformations or damages occur on the surfaces of the roads.

Such deformations or damages inflicted on the surfaces of the roads may deteriorate running conditions of vehicles to thereby cause various uncomfortable problems. These problems may happen on unpaved roads or paved roads, such as asphalt or concrete roads.

Meanwhile, in order to maintain and control conditions of road surfaces of general urban districts to be always clean and normal, road maintenance and repair teams of district offices or city halls are always inspecting surfaces of roads. A road maintenance and repair plan or schedule is set up on the basis of the road inspection results.

In general, in order to maintain and control conditions of road surfaces on existing roads or airport runways, inspectors directly step on the roads to check states of roads. A road maintenance and repair plan or schedule is set up depending upon reports of the inspection results of the inspectors.

However, since such a road maintenance and repair plan or schedule is set up depending upon reports of the subjective inspection results of the individual inspectors, it has been difficult to objectively decide a priority of the maintenance and repair plan. In particular, senior officers who should make up a road maintenance and repair plan or schedule without going out on the spot cannot make an objectively correct judgment.

SUMMARY OF THE INVENTION

To overcome inconveniences of the conventional art, it is an object of the present invention to provide an automatic road surface pavement condition inspecting apparatus which automatically and comprehensively inspects a road surface pavement condition, and which makes the inspection results into images and digitized data to then be stored, to thereby make up and offer objective data so that the road surface pavement condition can be determined scientifically and objectively correctly.

To accomplish the above object of the present invention, there is provided an apparatus for automatically inspecting a road surface pavement condition, which is equipped in a vehicle, the automatic road surface pavement condition inspection apparatus comprising:

a road surface photographing unit having a CCD (Charge Coupled Device) camera and a digital camera, for photographing a road surface pavement condition of a road in order to inspect the road surface pavement condition;

a road surface rutting measuring unit for measuring a road surface bend state, which comprises: a transverse support which is transversely arranged in front of or at the rear side of the vehicle; a number of height sensors which are installed on the transverse support; acceleration sensors which are respectively disposed in correspondence to wheel tracks of the vehicle; and a speedometer which is mounted on one of the wheels of the vehicle in order to measure speed of the vehicle;

a position decision unit having a global positioning system (GPS), for determining position of the vehicle, and having a relative coordinate positioning system, for determining relative position and distance;

a data analysis and storage unit for analyzing and storing various kinds of data, which comprises: a video cassette recorder (VCR) which stores video images photographed by the CCD camera of the road surface photographing unit; a video analyzer which analyzes and processes video images photographed by the digital camera; a central computer which stores signals processed by the video analyzer; a multi-channel analyzer which processes electrical signals transmitted from the height sensors and the acceleration sensors of the road surface rutting measuring unit; and a portable memory which temporarily stores the video images photographed by the CCD camera and the digital camera;

a road surrounding circumstance photographing unit for photographing left and right views of the road, which comprises: a front-end camera which is installed in front of the vehicle; upper-end cameras which are installed at the front and rear sides of the upper portion of the vehicle and at the left and right sides of the upper portion of the vehicle, respectively; and road surface proximity cameras which photograph road surfaces proximate to the road;

a traveling noise measuring unit for measuring traveling noise on the road, which comprises a noise measuring sensor which is installed on the bottom of the vehicle; and an auxiliary unit for supplying electric power to the road surface photographing unit, the road surface rutting measuring unit, the position decision unit, the data analysis and storage unit, the road surrounding circumstance photographing unit, and the traveling noise measuring unit.

Preferably but not necessarily, the automatic road surface pavement condition inspection apparatus further comprises: a flatness measuring unit for measuring a road transverse flatness.

As described above, the automatic road surface pavement condition inspection apparatus is equipped in a vehicle and thus automatically inspects a road surface pavement condition and a state of surrounding circumstances of a road, when the vehicle runs along the road, to thereby makeup and offer objective data that everyone can easily grasp and thus provide a road inspector with the objective data for maintenance and repair and post-control and pre-control of the road.

BRIEF DESCRIPTION OF THE DRAWINGS

The above and/or other aspects of the present invention will become apparent and more readily appreciated from the following description of the exemplary embodiments, taken in conjunction with the accompanying drawings in which:

FIG. 2 is a top view plane showing the vehicle employing the automatic road surface pavement condition inspection apparatus of FIG. 1; and FIG. 3 is a bottom view showing the vehicle employing the automatic road surface pavement condition inspection apparatus of FIG. 1.

DETAILED DESCRIPTION OF THE INVENTION

Figure 1:
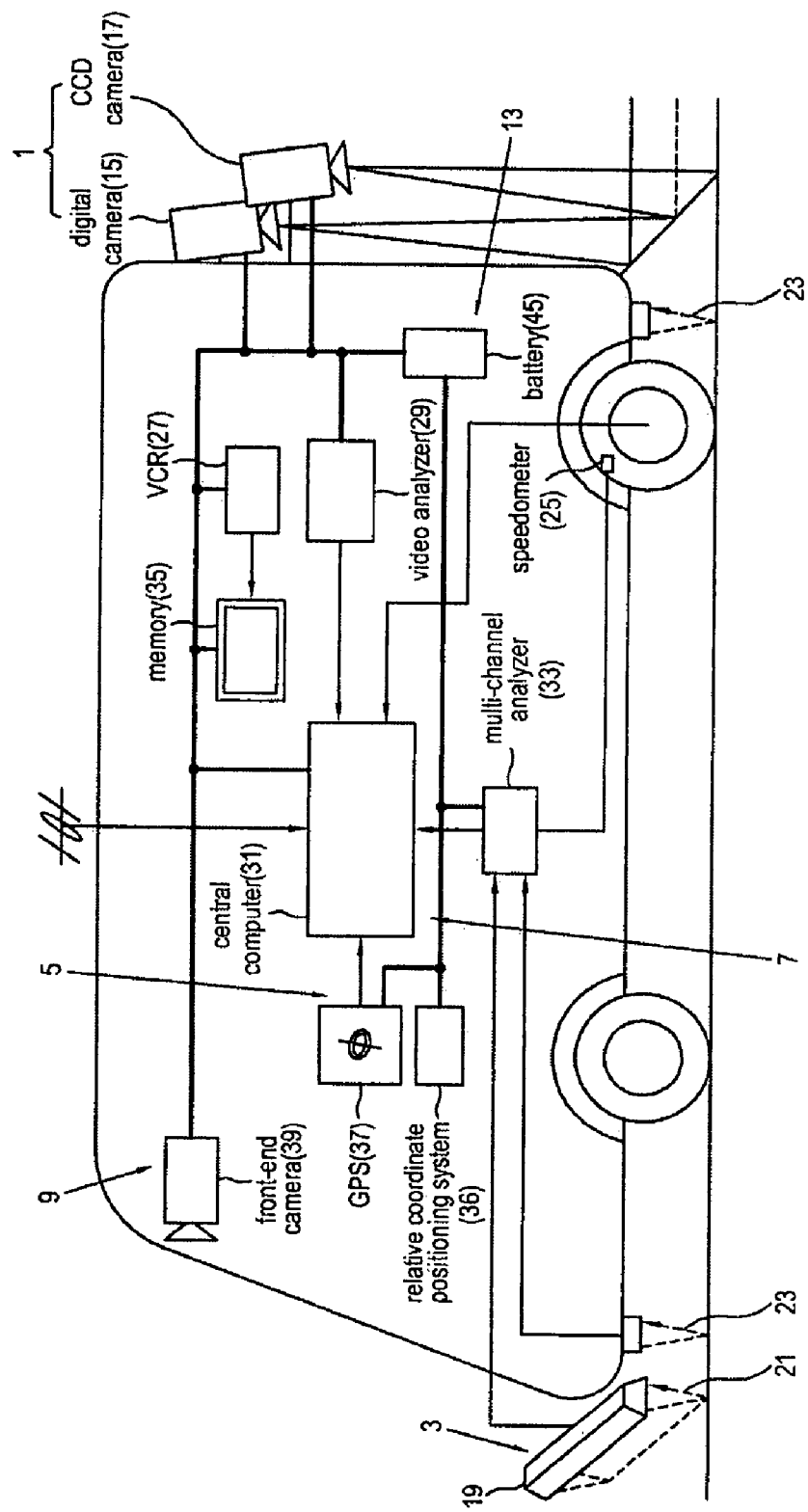
FIG. 1 is a schematic structural diagram showing a vehicle employing an automatic road surface pavement condition inspect ion apparatus according to the present invention.

Hereinbelow, an automatic road surface pavement condition inspection apparatus according to the present invention will be described with reference to the accompanying drawings. Like reference numerals are assigned for like elements in the drawings.

As shown in FIGS. 1 to 3, an apparatus for automatically inspecting a road surface pavement condition, according to the present invention is equipped in a vehicle. The automatic road surface pavement condition inspection apparatus according to the present invention includes: a road surface photographing unit 1 for photographing a road surface pavement condition of a road, in order to inspect the road surface pavement condition; a road surface rutting measuring unit 3 for measuring a road surface bend state; a position decision unit 5 for determining position of a vehicle; a data analysis and storage unit 7; a road surrounding circumstance photographing unit 9 for photographing front and rear views and left and right views of the road; and a traveling noise measuring unit 11 for measuring traveling noise on the road, and an auxiliary unit 13 for supplying electric power to the road surface photographing unit 1, the road surface rutting measuring unit 3, the position decision unit 5, the data analysis and storage unit 7, the road surrounding circumstance photographing unit 9, and the traveling noise measuring unit 11.

The road surface photographing unit 1 includes a CCD (Charge Coupled Device) camera 15 and a digital camera 17, which are installed at the rear end of the vehicle.

The reason why road surfaces are photographed using the CCD (Charge Coupled Device) camera 15 and the digital camera 17, is to store the road surface photographed image in analog form and digital form and then use either one as necessary.

The road surface rutting measuring unit 3 includes: a transverse support 19 which is transversely arranged in front of or at the rear side of the vehicle; a number of height sensors 21 which are installed on the transverse support 19; acceleration sensors 23 which are respectively disposed in correspondence to wheel tracks of the vehicle; and a speedometer 25 which is mounted on one of the wheels of the vehicle in order to measure speed of the vehicle.

Laser sensors should be necessarily used as the acceleration sensors 23 which are respectively disposed in correspondence to wheel tracks of the vehicle, in order to more correctly determine heights of the road surfaces.

Laser sensors should be necessarily used as the acceleration sensors 23 which are respectively disposed in correspondence to wheel tracks of the vehicle, in order to more correctly grasp heights of the road surfaces.

The road surface rutting measuring unit 3 reads difference in heights of the transverse cross-section of the road due to the plastic deformation, that is, rutting of the road surface pavement, to thus measure a road surface bend state, and also measures depth of the road in combination with the speedometer 25 due to the plastic deformation, that is, rutting of the road surface pavement, and digitize the measured height difference or depth to then be stored.

Meanwhile, the automatic road surface pavement condition inspection apparatus according to the present invention further includes a flatness measuring unit for measuring a road transverse flatness, in addition to the road surface rutting measuring unit 3.

The data analysis and storage unit 7 for analyzing and storing various kinds of data, includes: a video cassette recorder (VCR) 27 which stores video images photographed by the CCD camera 15 of the road surface photographing unit 1; a video analyzer 29 which analyzes and processes video images photographed by the digital camera 17; a central computer 31 which stores signals processed by the video analyzer 29; a multi-channel analyzer 33 which processes electrical signals transmitted from the height sensors 21 and the acceleration sensors 23 of the road surface rutting measuring unit 3; and a portable memory 35 which temporarily stores the video images photographed by the CCD camera 15 and the digital camera 17.

The data analysis and storage unit 7 digitizes all data of the speed and position of a vehicle, the road surface condition of a road, a road surrounding circumstance, and saves the digitized result, to thereby enable users to determine the road surface condition objectively.

In particular, the central computer 31 analyzes rutting of the road, the transverse flatness, and the road surface damage state, on the basis of the data transferred from various measuring units such as the road surface photographing unit 1, the road surface rutting measuring unit 3, the data analysis and storage unit 7, the road surrounding circumstance photographing unit 9, and the traveling noise measuring unit 11, and makes up a database according to the analyzed result to then be stored, in which the database can be used as a material which enables users to set up a comprehensive road maintenance and repair plan.

The position decision unit 5 has a global positioning system (GPS) 37, for determining current position of the vehicle, using a satellite, and transfers the signal detected by the GPS 37 to the central computer 31 so as to record the accurate position of the vehicle. The central computer 31 stores the road surface condition and the road surrounding circumstance together with the position information of the road, to thereby enable users to determine the road surface condition and the road position. The position decision unit 5 has a relative coordinate positioning system 36, for determining relative position and distance of the road.

The road surrounding circumstance photographing unit 9 for photographing front and rear views and left and right views of the road, includes: a front-end camera 39 which is installed in front of the vehicle as shown in FIG. 1; upper-end cameras 41 which are installed at the front and rear sides of the upper portion of the vehicle and at the left and right sides of the upper portion of the vehicle, respectively; and road surface proximity cameras 43 which photograph road surfaces proximate to the road.

The front-end camera 39 which is installed in front of the vehicle measures a road surface condition with respect to the front side of the vehicle and transfers the measured result to the VCR 27 and the central computer 31 to then be stored therein. The upper-end cameras 41 which are installed at the front and rear sides of the upper portion of the vehicle and at the left and right sides of the upper portion of the vehicle, respectively, inspect the neighboring facilities of the road whose surface is measured.

The road surface proximity cameras 43 which photograph road surfaces proximate to the road, photograph roads on which vehicles run, so that the road surface images can be stored. Accordingly, the road surface images can be provided as accurate information on the road surface condition together with the road surface bend state measured by the road surface rutting measuring unit 3.

The traveling noise measuring unit 11 includes a noise measuring sensor which is installed on the bottom of the vehicle, as shown in FIG. 3, and measures traveling noise on the road. The traveling noise is used as a material which enables users to forecast a pavement damage degree according to the traveling noise degree.

The auxiliary unit 13 for supplying electric power to the road surface photographing unit 1, the road surface rutting measuring unit 3, the position decision unit 5, the data analysis and storage unit 7, the road surrounding circumstance photographing unit 9, and the traveling noise measuring unit 11, is a battery or a generator 45 which is an electric power supply.

As described above, the automatic road surface pavement condition inspection apparatus according to the present invention enables the VCR 27 to store the images photographed by the road surface photographing unit 1 which includes the CCD (Charge Coupled Device) camera 15 and the digital camera 17, and the road surrounding circumstance photographing unit 9 having the front-end camera 39, the upper-end front and rear and left and right cameras 41, and the road surface proximity cameras 43 which photograph the front and rear and left and right views, therein, and the central computer 31 to store the digitized data therein.

The height data according to the bend of the road which is detected by the height sensors 21 and the acceleration sensors 23 of the road surface rutting measuring unit 3 is combined with the speed data of the speedometer 25, to thereby measure the road surface bend state three-dimensionally.

Meanwhile, the traveling noise measuring unit 11 measures a traveling noise degree of noise which is generated when a vehicle run on a road, and stores numerical data on how the vehicle is shaken according to the traveling noise degree.

As described above, the automatic road surface pavement condition inspection apparatus according to the present invention measures information on road surfaces and road surrounding circumstances and stores the information as images and numerical data, to thereby enable users to judge the road surface state accurately and objectively.

As described above, the automatic road surface pavement condition inspection apparatus according to the present invention provides an effect which enables others as well as an inspector who inspects roads to judge a road surface condition objectively, to thereby enable users to use the inspection results as a material for an accurate road maintenance and repair control.

The present invention is not limited to the above-described embodiment. It is apparent to one who has an ordinary skill in the art that there may be many modifications and variations within the same technical spirit of the invention.

What is claimed is:

1. An apparatus for automatically inspecting a road surface pavement condition, which is equipped in a vehicle, the automatic road surface pavement condition inspection apparatus comprising:

a road surface photographing unit having a CCD (Charge Coupled Device) camera and a digital camera, for photographing a road surface pavement condition of a road in order to inspect the road surface pavement condition;

a road surface rutting measuring unit for measuring a road surface bend state, which comprises: a transverse support which is transversely arranged in front of or at a rear side of the vehicle; height sensors which are installed on the transverse support; acceleration sensors which are respectively disposed in correspondence to wheel tracks of the vehicle; and a speedometer which is mounted on one wheel of the vehicle in order to measure speed of the vehicle;

a position decision unit having a global positioning system (GPS), for determining a position of the vehicle, and having a relative coordinate positioning system, for determining relative position and distance;

a data analysis and storage unit for analyzing and storing various kinds of data, which comprises: a video cassette recorder (VCR) which stores video images photographed by the CCD camera of the road surface photographing unit; a video analyzer which analyzes and processes video images photographed by the digital camera; a central computer which stores signals processed by the video analyzer; a multi-channel analyzer which processes electrical signals transmitted from the height sensors and the acceleration sensors of the road surface rutting measuring unit; and a portable memory which temporarily stores the video images photographed by the CCD camera and the digital camera;

a road surrounding circumstance photographing unit for photographing front and rear views and left and right views of the road, which comprises: a front-end camera which is installed in front of the vehicle; upper-end cameras which are installed at the front and rear sides of an upper portion of the vehicle and at the left and right sides of the upper portion of the vehicle, respectively; and road surface proximity cameras which photograph road surfaces proximate to the road;

a traveling noise measuring unit for measuring traveling noise on the road, which comprises a noise measuring sensor which is installed on the bottom of the vehicle; and an auxiliary unit for supplying electric power to the road surface photographing unit, the road surface rutting measuring unit, the position decision unit, the data analysis and storage unit, the road surrounding circumstance photographing unit, and the traveling noise measuring unit.

* * * * *